Aug. 30, 1932.    H. ZOCHER    1,873,951
POLARIZERS OF LIGHT AND A METHOD OF PREPARATION
Filed Nov. 10, 1925
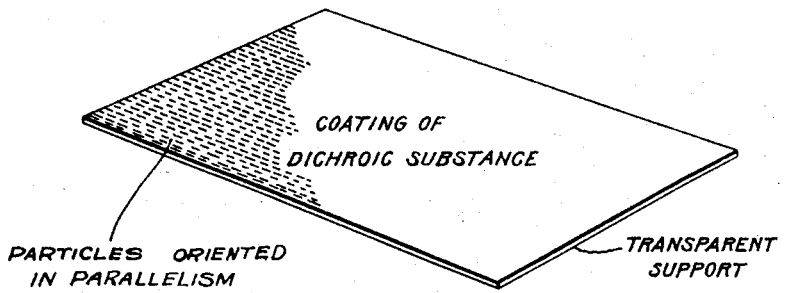
Inventor:
Hans Zocher,
by
His Attorney.

Patented Aug. 30, 1932

1,873,951

UNITED STATES PATENT OFFICE

HANS ZOCHER, OF BERLIN, GERMANY, ASSIGNOR TO GENERAL ELECTRIC COMPANY, A CORPORATION OF NEW YORK

POLARIZERS OF LIGHT AND A METHOD OF PREPARATION

Application filed November 10, 1925. Serial No. 68,233.

The present invention comprises new transparent articles, on which is provided a surface layer of light polarizing material. It is the object of my invention to provide a convenient and inexpensive polarizing medium. My invention includes both a new polarizing medium and a new method whereby a polarizing medium is produced, comprising transparent bodies.

The polarizing articles according to the present invention consist of a transparent support on which has been applied a dichroic coating, that is, a coating which is capable of polarizing transmitted light.

In accordance with one of the features of my invention, the particles of the dichroic substance, for example, rods or discs, are oriented in a given direction. They may be arranged in parallel directions by allowing a suspending medium to flow in a desired direction over a support.

The accompanying drawing shows a support provided with a polarizing medium embodying my invention.

The transparent support may consist of natural or artificial crystals as rock crystal, fluor spar, felspar, mica, gypsum etc. or agglomerates of crystals arranged parallel with respect to each other or artificial crystals. Isotropic bodies may be used after their surface has artificially been made anisotropic. In such cases the film of dyestuffs as colored substances applied to the surface may in itself be in a state capable of polarizing light. In all cases where the film does not polarize light it can be brought in such a state by polishing or rubbing it in one direction. As anisotropic bodies one may use natural crystals or may use natural or artificially prepared cellulose or cellulose derivatives as for instance cellulose esters (nitro cellulose, acidulated cellulose, alkylated cellulose) or cellulose formed by decomposition of cellulose derivatives as for instance the so called viscose. In cases where the surface is made anisotropic by artificial means the foregoing mentioned materials may be used as well as other substances as for instance glass, quartz, silica, artificial resins etc. In all cases where the film has artificially been brought in a condition to polarize light all above mentioned substances may be used as support.

The dichroic substances may be dyestuffs as for instance methylene blue, neutral red, methylene green or any other idiochromatic or allochromatic body as for instance herapatite.

In the following I describe by way of example the preparation of a polarizing article from a natural anisotropic support. I prepare by splitting from a large homogenous unitary mineral, which may be easily split, for instance a plate of suitable size with fresh surface and apply for instance a solution of methylene blue, which I have found is very suitable for the purpose of my invention, in a suitable readily vaporizable solvent on the said plate. Instead of splitting the crystal a fresh surface may be obtained by dipping the crystal in a suitable solvent. It is also possible to create artificially an anisotropic surface by polishing for example a glass plate. The application of the colored solution may be carried out by pouring it out on the said surface or by atomizing it and bringing it as a spray over the said surface or by dipping the plate into the said solution or in any suitable manner as for instance painting the plate with the said solution. As suitable solvents one may use alcohol, ether etc. A small amount of a suitable binder such as arabic gum, glue, soaps or cellulose compounds etc. may be added to the solution to give a homogenous, adherent film. The evaporation may be hastened by heating the plate or the surface or by conducting air or gases (as nitrogen, combustion gases, carbonic acid, etc.) heated or of ordinary temperature over the surface or by applying a vacuum or diminished pressure or by employing the several agents at the same time. If one views a plate prepared as hereinbefore described by a so-called Nicol prism or before a brilliant reflecting non-metallic surface under an angle of incidence of 50° the brightness of the light passing through the colored layers depends in high degree on the position to the polarizing plane of the illumination light, the layer acting like a turmaline plate.

In the same manner as hereinbefore described one applies a colored solution on an artificial transparent isotropic support. When however the film has been dried, it is rubbed or polished by applying a polishing medium for instance cotton or cotton wool or such like in a certain direction, the one may be inverse or reciprocative to the other, but always parallel to each other. One has to avoid an angular direction of the rubbing or polishing to the first used direction. One rubs or polishes until the desired polarizing property is imparted thereto. This is ascertained by examining the plate against polarized light. The amount of polarized light transmitted by the plate will vary depending on the relation of the plane of the polarized light to the direction in which the rubbing of the colored film has been carried out. When the polished film is held in such position that the transmission of polarized light is at a maximum, then the film after turning through an angle of 90° will cause the transmission of light to fall to a minimum, the film changing from light to dark.

The extent of selective absorption above described is increased in the presence of a slight amount of moisture, for example, by breathing on the film before, during or after polishing.

The article can have dichroic layers in which the direction of the anisotropy changes, preferably continuously. Such plates may be prepared by rubbing it in a rotating direction. The polishing may be carried out with cotton fastened to the end of a rotating disk which may be driven by a motor or may be rotated by hand. If one views through the film so produced, a beam of polarized light, then a dark cluster comprising opposite segments is observed which rotates with the rotation of the polarized beam.

A polished film thus produced, when viewed in polarized light, light received from the due north in northern latitudes, shows a dark bar on a light background, the angular position of which depends on the position of the sun. As the angle of polarization of light received from the sky due north varies with the position of the sun, such a film can be used as an hour glass when oriented properly from a fixed point of reference. The polished film may be used for comparing the intensity of light, as for instance measuring brilliancy, photometering and such like.

A special method of preparing the polarizing agents consists in applying the dichroic substances in the form of a colloidal solution (for example, extremely finely divided substances) on the support and affecting the parallel position of the disperse particles, composed of very small rods or discs. This may be caused by allowing the solution to flow over the support or otherwise spreading same in one direction on the support. By vaporizing the solvent layers are obtained in which the colloid particles are parallel to each other and impart an optical anisotropy to the whole layer. For carrying out this modification of my invention I may pour in one direction a solution of 1 part by weight benzopurpurine 4 B, free of electrolytes in 100 parts by weight of water upon a suitable support, for instance a glass plate. The dried layer shows a high dichroism, so that the light swinging with an electric vector parallel to the flowing direction passes easier through the layer than the light swinging vertically to the said flowing direction. If the layer is rubbed or polished as before described, an inverse dichroism is obtained, causing the absorption of light to swing parallel to the direction of the rubbing or polishing in a higher degree than the light of another direction.

The parallel position of the colloidal particles may be facilitated by means of electrical action which may be effected by an alternate or continuous current which is conducted through the liquid or by subjecting the liquid while flowing to the action of a magnetic field.

For the purpose of eventually increasing the dichroism, reactions may come in question with gaseous or other non solving reagents for instance in case that dyestuffs are used which are salts of colored acids one may subject the film on the surface to the action of acid vapours which are able to liberate the color acid. Of course acids which would destroy the color cannot be used. Suitable acids are for instance hydrochloric acid, acetic acid, formic acid etc.

The manner of applying and drying the film and of using binding agents are the same as in the precedent cases.

What I claim as new and desire to secure by Letters Patent of the United States is:

1. An article of manufacture, a medium comprising a transparent support, and a layer thereon of a substance the particles of which are arranged to a predominant extent parallel to one another thereby being rendered capable of polarizing a substantial part of light transmitted thereby.

2. An article of manufacture, a medium comprising a transparent support with an anisotropic surface thereon and a layer of a dyestuff the particles of which have been arranged in parallel lines to a predominant extent and therefore are capable of polarizing a large part of light transmitted thereby.

3. An article of manufacture comprising a transparent support and a layer of methylene-blue provided thereon, the particles of such layer being predominantly oriented parallel to each other and thereby being capable of polarizing a substantial part of light transmitted thereby.

4. An article of manufacture comprising a transparent support, and a light-transmitting layer thereon of dyestuff comprising non-spherical particles, said particles being arranged with such degree of parallelism that a substantial part of light transmitted by said layer is polarized.

5. The method of preparing an optical polarizer which consists in rendering the surface of a transparent medium anisotropic, applying a dichroic material on said surface, and causing the particles of said substance to assume parallel relationship.

6. The method of preparing an optical polarizer which consists in rendering the surface of a transparent medium anisotropic, then applying a dichroic material on said surface and rubbing the surface so coated along regular lines.

7. The method of preparing an optical polarizer which consists in rendering the surface of a transparent medium anisotropic, then applying a dichroic material on said surface and rubbing the surface so coated along parallel lines.

8. The method of preparing a light-polarizing medium which consists in applying a layer of dyestuff on a transparent support and exposing said layer to reagents which chemically attack said dyestuff and produce polarizing properties in said layer.

9. A light polarizer comprising a transparent support and an adherent film thereon of a light transmitting substance having elongated elements oriented in parallel lines to a predominant extent, said film thus being rendered capable of polarizing a substantial part of light transmitted thereby.

HANS ZOCHER.